April 4, 1967 C. O. BAKER 3,312,506
TRANSPORTATION OF SOLIDS IN PIPELINES
Filed Sept. 23, 1965
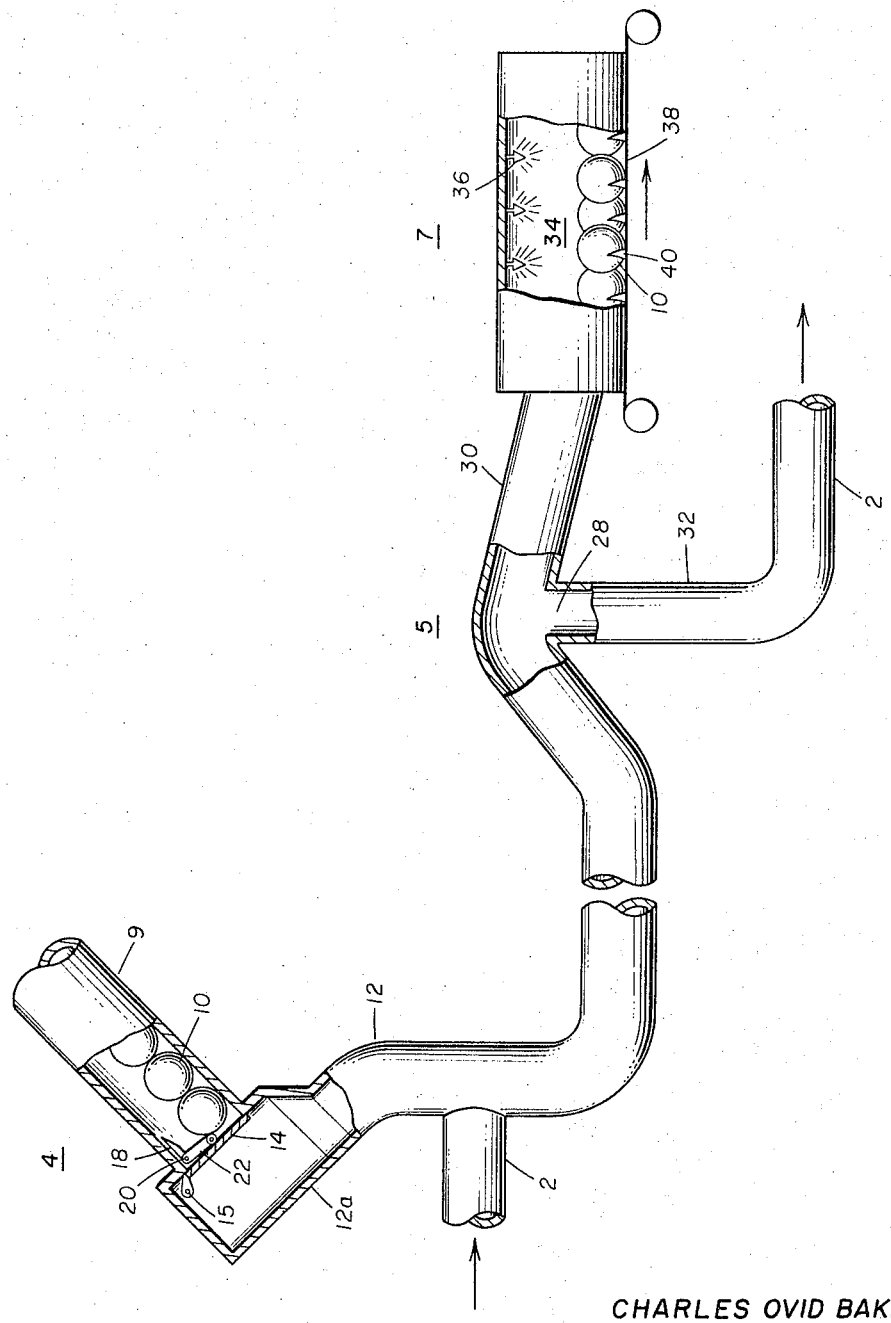
CHARLES OVID BAKER
INVENTOR
BY *William R. Jackson*
ATTORNEY United States Patent Office 3,312,506
Patented Apr. 4, 1967

3,312,506
TRANSPORTATION OF SOLIDS IN PIPELINES
Charles Ovid Baker, Garland, Tex., assignor to Mobil Oil Corporation, a corporation of New York
Filed Sept. 23, 1965, Ser. No. 489,526
9 Claims. (Cl. 302—66)

This invention relates to the pipeline transportation and retrieval of solids in capsule form and more particularly to the transportation of sulfur in oil-carrying pipelines and the retrieval of sulfur from such pipelines.

The concept of transporting solids in fluid-carrying pipelines has long been known. For example, it has been proposed to transport various solids such as sulfur or coal in the form of slurries. The use of slurries in the transportation of such solids has several inherent disadvantages. Pumping power requirements for the pipeline may be increased to the point where its operation is uneconomical. Also, additional problems are present in those cases where the solid material in the slurry is contaminated by the fluid in the pipeline, or vice versa, and in the separation of the solid from slurry.

In order to overcome these and other disadvantages inherent in the pipeline transportation of solids in slurries, it has been proposed to transport various solids in the form of capsules which are moved through the pipeline by the flow of fluid therethrough. An example of this can be found in recent proposals regarding the transportation of sulfur obtained from oil and gas producing operations in the Province of Alberta, Canada. In these operations, sulfur is produced with gas and oil as hydrogen sulfide. The regulatory bodies of Alberta do not permit the release of sulfur to the atmosphere as hydrogen sulfide or sulfur dioxide. In view of this, most of the operators convert it to elemental sulfur. Since the present methods of shipping elemental sulfur to the nearest markets often have proved to be prohibitively expensive, these operators are interested in finding more economical methods of transporting their sulfur.

These circumstances have led to research in the direction of sulfur transport in crude oil pipelines by means of capsules, which for the most part take the form of solid ingots of sulfur. Research has shown that the presence of the so-called capsules in the pipeline under some circumstances lead to only minor increases in power requirements for the pipeline and, in fact, in some cases may even lower the pipeline pumping requirements. This method therefore shows some promise from an economical point of view. Heretofore a drawback has existed in this method of transporting sulfur because of the presence of protective coatings on the sulfur ingots. These coatings are necessary in order to prevent contamination of the oil with the sulfur. However, this presents the problem of, once the ingots are delivered to the terminal station, economically and expeditiously removing the protective coatings from the sulfur ingots.

In accordance with the instant invention, there is provided a method of transporting a substance in a fluid-carrying pipeline in capsule form and thereafter retrieving the capsules at a suitable terminal station and removing the protective coatings of these capsules. In carrying out the invention, capsules having an inner core of the substance to be transported are inserted into a fluid-carrying pipeline. These capsules are provided with an outer protective coating of a material which is substantially insoluble in the fluid in the pipeline and has a melting point different from the melting point of the substance comprising the inner core. The capsules are moved through the pipeline by the flow of fluid therethrough to a suitable terminal station. At the terminal station the capsules are removed from the pipeline. Thereafter, the capsules are heated to a temperature at least as great as the melting point of one of the substance and protective material. In this manner, the coatings and inner cores of the capsules may be separated, for example, by converting the former to a liquid while retaining the latter in their solid form.

In a preferred embodiment of the invention, there is provided a method for the retrieval of sulfur transported through an oil-carrying pipeline in capsules having protective coatings of a material which melts at a lower temperature than the sulfur. This method is accomplished by removing the capsules from the pipeline at a suitable terminal station and passing these capsules into a steam zone where they are sprayed with steam at a temperature greater than the melting point of the protective coating but less than the melting point of the sulfur. The steam melts the coatings from the sulfur cores which then are separated from the protective material and transferred from the steam zone to a suitable storage or delivery point.

In yet another aspect of the invention there is provided a system for transporting sulfur or other substances in the form of capsules having a protective coating. The system comprises a pipeline extending from a delivery point to marketing facility or other suitable terminal station. Launching means is provided at the delivery station for inserting the capsules into the pipeline. At the terminal station there is provided means for heating the capsules to a temperature at least as great as the melting point of the material comprising the protective coating. Also located at the terminal station is suitable retrieval means for removing the capsules from the pipeline and delivering them to the aforementioned heating means. Preferably, the heating means takes the form of a steam bath in which high pressure steam is directed against the capsules.

For a better understanding of the instant invention, reference may be had to the following detailed description and the accompanying drawing which is an elevation partly in section of a fluid-carrying pipeline provided with suitable implements for carrying out the present invention.

With reference to the drawing, there is shown a pipeline 2 provided with a capsule launching system 4, a capsule retrieving system 5, and a heating or separation sytsem 7. The capsule launching system 4 may take the form of any suitable mechanism for launching or inserting the capsule into the pipeline either automatically or manually. The system may so insert the capsules individually or in lots of any desired number.

The launching system 4 as shown in the drawing comprises a system for individually inserting spherical capsules into the pipeline. It will be understood, however, that the capsules may take any suitable form of a size and shape receivable in the pipeline. For example, they may be cylindrical or ellipsoidal in shape. However, in most cases it will be preferred to use spherical capsules since they normally result in lesser increases in pumping requirements than capsules of other shapes. The launching mechanism comprises a barrel 9 adapted to hold a plurality of capsules 10 and a feeder line 12 which functions to deliver the capsules under the influence of gravity into the pipeline 2. If necessary, barrel 9 may be pressured with a suitable fluid in order to minimize the pressure differential between the barrel and line 12. The port opening from the barrel 9 into the housing 12a defined by the upper portion of line 12 is provided with a normally closed valve 14 which is keyed to a lever arm 15 which in turn is pivotally mounted in housing 12a. The valve 14 is provided with a suitable catch assembly which prevents the delivery of more than one capsule each time the valve 14 is opened. The catch assembly comprises a catching arm 18 which is pivotally mounted in the barrel as shown at 20 and interconnected with the valve 14 for operation therewith by means of a suitable linkage 22.

Valve actuating means (not shown) is provided for opening valve 14. The valve actuating means may comprise simply a handle on lever arm 15 for manually opening the valve. It usually will be preferred, however, to provide an actuating means which automatically opens the valve 14 at predetermined time intervals or each time a predetermined volume of fluid flows through the line past a certain point. Such actuating means are well known in the art and will not be described further. When valve 14 opens, a spherical capsule 10 is delivered into a delivery line 12 and thence into the pipeline 2. As valve 14 opens, catch arm 18 automatically swings outwardly until it reaches a position where it is inclined at an angle of about 45 degrees from the axis of barrel 9. In this position, catch arm abuts the next succeeding capsule 10 and prevents its delivery into the delivery line. When valve 14 is thereafter closed, the catch arm is retracted to the position shown and the capsule 10 then falls to position adjacent the valve. This capsule then is delivered into line 12 the next time the valve is opened. The launching mechanism shown is conventional and is described here for illustrative purposes only. It will be understood that the launching mechanism per se forms no part of the instant invention and that any suitable such mechanism may be used.

The method of the instant invention now will be described with reference to the transportation of elemental sulfur by means of an oil-carrying pipeline. In carrying out the invention, capsules having an inner core of sulfur and an outer protective coating are inserted into the pipeline by means of a suitable launching system such as that shown in the drawing. The inner core of each capsule may consist of a single unitary body or it may comprise a plurality of fragments. Preferably, however, the capsules have unitary cores and are formed by casting the sulfur into ingots by means of molding or other suitable procedures and then providing each ingot with a protective coating.

The coating may be applied to the interior cores by any suitable procedure such as, for example, by spraying the protective material in liquid form onto the cores and then allowing it to solidify. Alternatively, the coating material may be preformed into a suitable shape and then applied to the interior core. For example, where the core of each capsule consists of a unitary spherical ingot, the coating may be applied by fitting two hemispherical segments of the protective material over the ingot and sealing the seam by a suitable procedure.

The coating material has a melting point above or below the melting point of the sulfur so that the coating and interior core may be separated by melting either the sulfur or protective material. The outer protective coating may be formed of any material of the requisite melting point characteristics which is not deleterious to the oil or sulfur and is substantially insoluble in the oil under the conditions existing in the pipeline.

The capsules are carried through the pipeline by the flow of the oil therethrough to the capsule-retrieving station 5 which comprises means for separating capsules from the oil in the pipeline. As shown in the drawing, the separating means comprises a liquid drop port 28 which is of a size smaller than the transported capsules. As the capsules pass this port, they pass into a retrieval line 30 and thence move under the influence of gravity into the heating system 7. The oil passes through port 28 into line 32 and continues through pipeline 2. The heating system 7 comprises a chamber 34 having a heating means therein such as a plurality of high pressure steam nozzles 36 and a suitable conveyer 38. Conveyer 38 may take the form of a grated belt.

In the embodiment of the invention in which the protective coating has a higher melting point than the sulfur or other substance comprising the interior core, the capsules are heated to a temperature greater than the melting point of the sulfur but less than the meling point of the protective coating. Means are provided within the chamber 34 for rupturing the outer protective coating in order to allow the melted sulfur to drain from within the coating. These rupturing means may take the form of a plurality of knives 40 mounted on conveyer 38. As the sulfur is melted, it drains from the ruptured outer coating of the material through the openings in conveyer 38 to a suitable collection container (not shown). The ruptured coatings are moved along conveyer 38 and expelled from the separation zone. A suitable protective material for use in this embodiment of the invention is polypropylene which is insoluble in oil and has a melting point on the order of about 170° C. This, of course, is well above the melting point of the sulfur and will provide a relatively wide temperature range within which the capsules may be heated. Also, the wide difference in specific gravity between polypropylene and sulfur will expedite separation of the sulfur and protective material should some of the protective material drop through the grated conveyer with the melted sulfur. In this regard, the relatively light polypropylene will float on the surface of the melted sulfur in the collection container and the sulfur can be drawn off from the lower portion of the container.

The above-described embodiment of the invention requires that some steps be taken to rupture the outer coating in order to allow the liquified sulfur to drain from the coating material. In a preferred embodiment of the invention, a protective coating material has a melting point less than the melting point of the sulfur. This enables separation of the sulfur and protective material by heating only without the necessity of separately rupturing the outer protective coating and allows the sulfur to be recovered in solid form. In this embodiment of the invention, the capsules are transferred to the heating zone 7 as before. In this case, however, the capsules are heated to a temperature at least as great as the melting point of the protective coating material but less than the melting point of the sulfur or other substance comprising the interior cores of the capsules. The melted protective material drains through grated conveyer 38 to a suitable collection zone while the inner cores of the capsules are moved along the conveyer 38 until they are expelled from the separation zone and delivered to a suitable terminal station such as a storage or processing facility (not shown).

Suitable material useful for forming protective coatings in this embodiment of the invention comprise polyethylene, polyvinyl alcohol, or polyvinyl ether. Polyethylene is particularly suitable since it is insoluble in water which often is dispersed in crude oil and may be obtained in a form having a melting point, e.g., about 95° C., below the melting point of the sulfur and yet well above the temperatures normally encountered in oil pipelines. The polyvinyl alcohol and polyvinyl ether plastics have a relatively high solubility in water. Thus, these plastics usually will be used only in those instances where the oil is free of water or contains only an unsubstantial amount of water such that no significant pitting of the coatings, with the resultant exposure of the sulfur cores to the oil, occurs in the pipeline.

Heating systems other than the steam system shown may be used such as, for example, indirect or radiant heat systems. However, the direct heating system shown utilizing steam as the heat transfer medium will be preferred in most cases since the coating material can be melted and washed from the interior cores without fear of dissolving the sulfur which, of course, is insoluble in the steam and condensate.

Having described specific embodiments of the instant invention, it will be understood that further modifications thereof may be suggested to those skilled in the art, and it is intended to cover all such modifications as fall within the scope of the appended claims.

What is claimed is:

1. In the transportation of a substance by a fluid-carrying pipeline, the method comprising the steps of:
   (a) inserting into said pipeline capsules having an interior core of said substance and an outer protective coating of a material which has a melting point different from the melting point of said substance;
   (b) moving said capsules through said pipeline by the flow of fluid therethrough;
   (c) removing said capsules from said pipeline; and
   (d) heating said capsules to a temperature at least as great as the melting point of one of said substance and said protective material whereby said one of said substance and said protective material is melted and removed from said capsules.

2. The method of claim 1 wherein said protective material has a melting point lower than the melting point of said substance and said capsules are heated to a temperature at least as great as the melting point of said protective material but less than the melting point of said substance whereby said coatings are removed from said capsules.

3. The method of claim 1 wherein said protective material has a melting point higher than the melting point of said substance and said capsules are heated to a temperature at least as great as the melting point of said substance and comprising the further step of rupturing said protective coating whereby said substance drains from within said coating.

4. In the transportation of sulfur by an oil-carrying pipeline, the method comprising the steps of:
   (a) inserting into said pipeline capsules having an interior core of sulfur and an outer protective coating of a material which has a melting point lower than the melting point of said sulfur;
   (b) moving said capsules through said pipeline by the flow of oil therethrough;
   (c) removing said capsules from said pipeline; and
   (d) heating the coatings of said capsules to a temperature at least as great as the melting point of said protective material but less than the melting point of said sulfur whereby said coatings are removed from said capsules.

5. In the method of transportation of sulfur by an oil-carrying pipeline, the method comprising the steps of:
   (a) casting said sulfur into spherical ingots of a size receivable in said pipeline;
   (b) providing said ingots with a protective coating of a material which has a melting point lower than the melting point of said sulfur;
   (c) inserting said coated ingots into said pipeline;
   (d) moving said coated ingots through said pipeline by flow of oil therethrough;
   (e) removing said coated ingots from said pipeline; and
   (f) heating the coatings of said ingots to a temperature at least as great as the melting point of said protective material but less than the melting point of said sulfur whereby said coatings are removed from said ingots.

6. In the retrieval of a substance transported through a fluid-carrying pipeline in the form of capsules having an interior core of said substance and an outer protective coating of a material which has a melting point different from the melting point of said substance, the method which comprises the steps of:
   (a) removing said capsules from said pipeline; and
   (b) heating the coatings of said capsules to a temperature at least as great as the melting point of one of said substance and said protective material whereby said one of said substance and said protective material is melted and removed from said capsules.

7. The method of claim 6 wherein said protective material has a melting point lower than the melting point of said substance and said capsules are heated to a temperature at least as great as the melting point of said protective material but less than the melting point of said substance whereby said coatings are removed from said capsules.

8. The method of claim 6 wherein said protective material has a melting point higher than the melting point of said substance and said capsules are heated to a temperature at least as great as the melting point of said substance and comprising the further step of rupturing said protective coating whereby said substance drains from within said coating.

9. In the retrieval of sulfur transported through an oil-carrying pipeline in the form of capsules having an interior core of sulfur and an outer protective coating of a material which has a melting point lower than the melting point of said substance, the method which comprises the steps of:
   (a) removing said capsules from said pipeline; and
   (b) heating the coatings of said capsules to a temperature at least as great as the melting point of said protective material but less than the melting point of said sulfur whereby said coatings are removed from said capsules.

References Cited by the Examiner

UNITED STATES PATENTS

| 2,947,578 | 8/1960 | Corneil et al. | 302—66 |
| 3,125,116 | 3/1964 | Schaberg | 302—2 |
| 3,206,256 | 9/1965 | Scott | 302—66 |

References Cited by the Applicant

H. S. Ellis, "The Pipeline Flow of Capsules, Part 3, An Experimental Investigation of the Transport by Water of Single Cylindrical and Spherical Capsules With Density Equal to That of the Water," The Canadian Journal of Chemical Engineering, February 1964, pp. 1–8.

H. S. Ellis et al., "Transporting Solids by Pipe Line Capsules and Slugs," Industrial and Engineering Chemistry, vol. 55, No. 9, September 1963, pp. 29–34.

H. W. Habgood, "Transportation of Sulfur by Pipeline," Oilweek, October 14, 1963, pp. 29–37.

C. A. Law, "Pipeline Transport May Boost Sulfur," Petro Process Engineering, May 1963, pp. 39–41 and 51.

ANDRES H. NIELSEN, *Primary Examiner.*